Patented Oct. 22, 1946

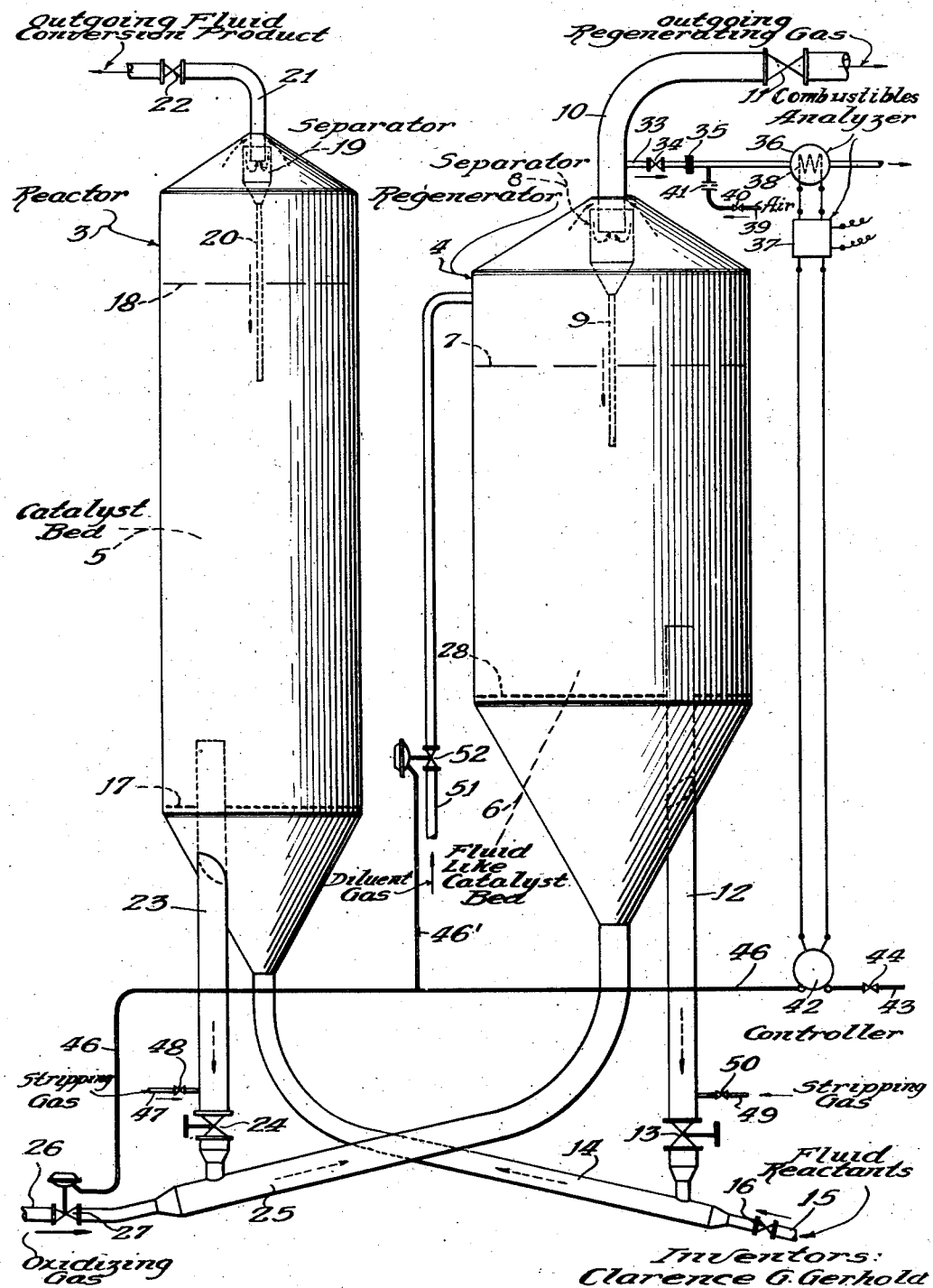

2,409,751

UNITED STATES PATENT OFFICE 2,409,751

CATALYTIC CONVERSION OF HYDROCARBONS

Clarence G. Gerhold, Chicago, Ill., and John E. Burgess, Sweeney, Tex., assignors to Universal Oil Products Company, Chicago, Ill., a corporation of Delaware Application December 22, 1943, Serial No. 515,266

8 Claims. (Cl. 196—52)

The invention relates to an improved process for the catalytic conversion of fluid hydrocarbons accompanied by regeneration of the catalyst and to an apparatus in which the improved mode of operation may be conducted. The invention is particularly concerned with improvements in the regenerating step of the process which prevent subjection of the catalyst to the excessively high temperatures which cause rapid deterioration of its activity in service.

The features of the invention will be found advantageous as applied to all reactions conducted in the presence of subdivided solid contact material or catalyst which requires regeneration by the burning of combustible contaminants therefrom and which is susceptible to damage at excessively high temperatures. Reactions such as the catalytic cracking of hydrocarbons employing a siliceous catalyst, such as, for example, solid particles comprising a composite of silica with one or more metal oxides, such as alumina and zirconia, exemplify operations to which the features of the invention are particularly applicable. The following description of the invention will, therefore, be directed particularly to its features as applied to catalytic cracking.

The term "cracking" is here used in a broad sense to include operations now generally termed "reforming" or "retreatment" wherein light hydrocarbon distillates, such as gasoline or gasoline fractions, naphtha and the like, are treated in the presence of cracking catalyst to improve their octane rating, susceptibility to lead tetraethyl and the like, as well as operations in which oils boiling above the range of gasoline are converted to produce substantial yields of the latter or in which normally liquid or normally gaseous hydrocarbons are cracked to produce more valuable lighter fractions.

The invention is more specifically directed to an operation of the type which has recently come into prominence and wide commercial use, wherein the subdivided solid catalyst employed is circulated continuously through separate confined reaction and regenerating zones and in each of which a relatively dense mass or bed of the catalyst particles is maintained. The bed in either or both zones and particularly in the regenerating zone is maintained in a fluid-like condition by passing air or other oxidizing gas employed for burning combustible contaminants from the catalyst upwardly through the bed at a sufficient velocity to partially counteract the force of gravity on the catalyst particles and bring about their hindered settling. This turbulent fluid-like condition of the catalyst bed in the regenerating zone is advantageous in several important respects. It facilitates circulation of the catalyst through the system and effects a substantially uniform distribution of heat through the catalyst bed undergoing regeneration, thus obviating the development of localized zones of excessively high temperature within the bed. It also facilitates control of the average temperature attained within the bed without the use of extensive and well distributed heat exchange surfaces, such as a multiplicity of tubular elements through which cooling fluid is circulated in indirect contact with the catalyst of the bed to abstract excess heat therefrom.

With the use of a relatively dense fluidized catalyst bed in the regenerating zone, the separation of a major portion of the catalyst particles from the outgoing stream of hot gaseous products of regeneration is effected by keeping the upper extremity of the bed well below the point in the upper portion of the regenerating vessel from which the outgoing regenerating gas is removed. This gives a light phase region above the fluid bed which has a materially reduced solid particle concentration as compared with that prevailing within the bed.

A phenomenon known as "after-burning" sometimes occurs in this light phase region where the concentration of solid particles is not sufficiently high to bring about the rapid dissipation of heat. In studying this phenomenon in regenerating equipment provided with observation ports, we have found that a flash will occur in the light phase and may be followed by sustained burning therein with a visible flame. This condition is accompanied by a pronounced glowing of the solid particles in the vicinity of the flash or flame, indicating that they have retained a temperature at which their catalytic activity is destroyed or materially impaired.

We attribute the occurrence of after-burning to the presence of a flammable gas mixture in the light phase. This mixture normally includes various products of combustion such as carbon dioxide, carbon monoxide and steam, as well as free oxygen, which has passed through the bed of solid particles without being consumed, and nitrogen, in case air is employed as the regenerating gas. The combustibles in this mixture, in addition to carbon monoxide, often include volatile hydrocarbons driven from the fluid-like bed of solid particles without having burned within the bed. Ignition of the flammable mixture is probably brought about by its contact with a hot surface in the upper portion of the regenerating vessel, and once after-burning is started it is difficult to extinguish or control. In some instances it has carried over into the cyclone separating equipment communicating with the light phase and resulted in damage to the latter, which is not conveniently constructed to withstand high temperatures. However, greater significance is attached to the damage caused by after-burning to the catalyst or contact material.

Cracking catalyst of the type above mentioned, even when substantially free of low melting components, such as alkali metal compounds, rapidly deteriorates in activity when subjected to temperatures above approximately 1300° F., or thereabouts. This is true of other catalysts commonly employed for promoting the conversion of hydrocarbons and other fluid reactants and, in some instances, extensive damage to its activity is encountered at considerably lower temperatures. Therefore, when after-burning occurs, there is a rapid decline in the activity of the catalyst. Even though the concentration of catalyst particles in the light phase is relatively low, a major portion of the entire catalyst inventory within the system will have been present in the light phase at some time during a relatively short period of operation. Since the process is operated continuously over a prolonged period with only a small amount of catalyst replenishment to compensate for the loss of catalyst fines and keep the catalyst inventory substantially constant, even infrequent after-burning will cause a pronounced decline in the average activity of the entire catalyst inventory.

The primary purpose of the present invention is to prevent occurrence of the aforementioned phenomenon of after-burning and resulting rapid decline in catalyst activity and possible damage to plant equipment. We have found that this can be accomplished by keeping either the free oxygen content or the concentration of combustibles in the gas mixture in the light phase sufficiently low that this mixture is non-flammable under the conditions of temperature, pressure and solid particle concentration existing in the light phase. In our co-pending application, Serial No. 512,084, filed November 29, 1943, a method and means is disclosed for keeping the free oxygen concentration below the range where burning of the gas mixture with a flame will occur in a light phase of the regenerator. The present application is directed to a method and means for keeping the concentration of combustibles in the gas mixture existing in the light phase below the limit at which burning of the mixture will occur with a flame.

In the process of the present invention, the gas mixture existing in the light phase of the regenerator is diluted with non-combustible gas to such an extent that its combustible content is reduced to below the flammable range. Preferably, this is accomplished by supplying the air or other oxidizing gas employed for regeneration to the fluid-like bed in the regenerator at a rate such that a considerable portion of the oxygen passes through the bed without being consumed in burning combustibles therefrom. This excess air or oxygen passing from the fluid bed into the light phase above the latter reduces the percentage of combustible components in the gas mixture and, when employed in sufficient quantities, will thus keep the mixture outside the range of flammability.

It is also within the scope of the invention to introduce non-combustible diluent gas directly into the light phase in the regenerator in a sufficient quantity to insure that the resulting gas mixture is nonflammable under the conditions prevailing in the light phase. This feature of the invention may be employed as an alternative to the aforementioned feature of supplying excess oxygen or air through the fluid bed in the regenerator. However, when the second-named feature is employed, it is preferably used in conjunction with the feature of passing excess oxygen through the bed.

The combination of the two aforementioned features will be found particularly advantageous when the regenerator vessel is not of sufficient size to permit passage of the required quantity of excess oxygen through the bed without encountering a linear gas velocity through the latter which is too high to maintain the desired high concentration of solid particles in the fluid bed. It is, of course, possible to pass gas through the bed at such a high rate that little or no hindered settling of the solid particles will occur, so that they are carried through the bed at substantially the same net upward velocity as that of the gas. Such a condition results in inefficient regeneration because of the resulting short resident time for the solid particles in the regenerating step, since this is a function of the density or solid particle concentration of the bed as well as its size. Also, the low solid particle concentration which results from the use of excessively high gas velocities through the bed will not bring about the desired rapid distribution of heat throughout the bed, with the result that hot spots or localized zones of excessively high temperature may develop in the latter and thus defeat the primary purpose of avoiding excessive heating of the catalyst or contact material. We therefore prefer to limit the rate at which oxidizing gas is passed into the fluid bed to a value which will give the desired high solid particle concentration in the bed, and when this rate is not sufficient to keep the combustible content of the gas mixture in the light phase below the range of flammability, the additional diluent gas required is supplied directly to the light phase without passing it through the fluid bed. The additional diluent gas employed may comprise additional air or oxygen or any other readily available non-combustible gas such as carbon dioxide, nitrogen, or combustion gases of high $CO_2$ content. Steam may be employed when the catalyst or contact material is not damaged by contact therewith under the conditions of operation encountered in the regenerator. However, many cracking catalysts are susceptible to damage by contact with steam at high temperature, and in such instances some other diluent is preferably employed.

In addition to the aforementioned advantages of the preferred mode of operation above outlined in preventing after-burning and resulting rapid degradation in the activity of the contact material, supplying an excess rather than a deficiency of oxygen to the fluid bed in the regenerator will result in more complete removal of the combustible contaminants from the solid particles. This is advantageous in that it increases the activity of the regenerated solid particles being returned from the regenerating step to the reaction step. It will permit the use of a smaller reaction vessel for a given charging stock rate and per cent conversion of the charging stock or, in a vessel of given size, the charging stock rate or the per cent conversion or both may be increased.

We have found that when the concentration of combustibles in the gas mixtures existing in the light phase is kept below about 6 mol per cent, after-burning is not encountered under the conditions commonly employed in the regenerating step of the fluid bed type catalytic cracking system. However, it is not necessary to know the exact concentration required, and calculation of the rate at which oxidizing and/or diluent gas should be supplied to give the required low concentration of combustibles in the light phase is difficult even when the proper concentration is known. The most convenient and preferred method of controlling the rate at which regenerating gas is supplied to the fluid bed or diluent gas is supplied directly to the light phase or both, so as to prevent after-burning, is to directly determine the flammability or non-flammability of the gas mixture leaving the light phase continuously or at frequent intervals during the operation of the process and adjust the gas rate accordingly.

In order to preclude after-burning and correct the operating conditions to prevent its occurrence, rather than stop it after it is initiated, we propose to withdraw a representative sample stream of the gas mixture from the light phase and pass it through a confined combustion zone wherein conditions are employed which promote the burning of combustibles in the mixture. To insure the presence of a sufficient quantity of free oxygen in the sample stream to support combustion of its combustible components, air or oxygen is preferably added to the sample stream being supplied to the combustion zone at a constant rate. The increase in the temperature of the sample stream caused by its burning in the confined combustion zone varies in direct relation to the percentage of the combustibles presence in the sample. Thus, by measuring the temperature rise in the confined zone, an increasing proportion of combustibles in the gas mixture leaving a light phase can be detected.

By employing a higher normal temperature in the confined zone to which the sample stream is supplied as compared with the temperature in the light phase, and/or by employing a combustion-promoting catalyst in this zone, and by insuring the presence of air or oxygen for supporting combustion by adding the same to the sample stream, the latter will burn when its combustible content is considerably less than that at which burning would occur in the light phase of the regenerator. Therefore, with an analyzer of the type above mentioned, measurement of the temperature rise in the confined combustion zone will positively indicate when the concentration of combustibles in the light phase is approaching the damage point. Then the rate at which oxidizing gas is supplied to the fluid bed and/or the rate at which diluent gas is supplied directly to the light phase can be increased so as to preclude the occurrence of after-burning in the light phase.

Adjustment of the gas rates may be accomplished manually in response to a visible or audible indication from the analytical apparatus. However, in the preferred embodiment of the invention, the system is equipped and arranged for automatic adjustment of the gas rates in response and in direct relation to changes in the combustible content of the sample stream, as determined by the magnitude of an impulse transmitted from the analytical apparatus to a conventional control instrument which functions to regulate the amount of oxidizing gas supplied to the fluid bed and/or the amount of diluent gas supplied directly to the light phase.

Analyzers of a type suitable for use in the process provided by the invention are available on the market, and the specific form and operation of such equipment does not constitute a novel part of the invention per se. However, one instrument of the type which we have found suitable employs a coil or filament of platinum wire or the like, disposed within the combustion zone in contact with the sample stream passing therethrough and acting as a combustion-promoting catalyst. An electric current is passed through this coil, and the resistance offered by the coil to its passage increases with increasing temperature in the combustion zone caused by burning of the sample stream therein. Thus, with proper calibration and adjustment of the instrument, measurement of the resistance offered by the coil indicates the percentage of combustibles in the sample stream. In the preferred embodiment of the invention, changes in resistance through the platinum coil or filament are translated into an impulse which is transmitted to a suitable control instrument of conventional form which will function in response to a predetermined change in the magnitude of this impulse (and hence in response to a predetermined change in the concentration of combustibles in the sample) to open and close a valve in the line admitting oxidizing gas to the fluid bed and/or in the line admitting diluent gas to the light phase. Thus, the occurrence of after-burning in the light phase is automatically prevented.

The invention is explained in more detail in conjunction with the following description of the accompanying diagrammatic drawing. The drawing is an elevational view of one specific form of apparatus incorporating the features of the invention and in which the improved mode of operation provided by the invention may be successfully conducted.

Referring now to the drawing, a vertically elongated reaction vessel of substantially cylindrical form is indicated at 3 and is operated in conjunction with a similar regenerating vessel 4. The reactor 3 is employed as a zone in which hydrocarbons or other fluid reactants to be converted are contacted with a bed of subdivided solid particles, such as catalyst or contact material, in the presence of which the reactants are converted and upon which deleterious combustible deposits are formed as a result of the conversion reaction. The regenerator 4 is employed as a zone to which contaminated catalyst or contact material is supplied from the reactor and therein contacted with oxidizing gas to burn combustible deposits from the solid particles and thus effect their regeneration.

A relatively dense bed 5 of the subdivided solid particles is maintained in reactor 3 and another relatively dense bed 6 of the solid particles undergoing regeneration is maintained within regenerator 4. In the type of operation to which the invention is particularly directed, the bed of solid particles in the regenerating zone is maintained in a fluid-like condition, while still retaining a relatively high solid particle concentration in the bed, by passing the oxidizing gas employed for regeneration and resulting combustion gases upwardly through the bed at a velocity regulated to partially counteract the force of gravity on the solid particles and bring about their hindered settling within the bed. Preferably, the bed in the regenerator is sufficiently agitated and turbulent to obtain a substantially uniform temperature throughout the bed so as to avoid the development of hot spots or zones of localized excessively high temperature within the bed.

The approximate upper extremity of the relatively dense fluid-like bed in regenerator 4 is indicated by the broken line 7 in the drawing and a region known as the "light phase," in which the solid particle concentration is materially reduced relative to that prevailing in the fluid bed 6, is maintained in the upper portion of the regenerator between the upper extremity 7 of the bed and the point at which the gaseous products of regeneration and solid particles of the catalyst or contact material entrained in the outgoing gas stream are supplied to the separating equipment indicated at 8. Separator 8 may be, for example, of the centrifugal or cyclone type and is provided for the purpose of removing at least a substantial portion of the entrained solid particles from the outgoing gas stream. The separated solid particles are returned from the lower portion of separator 8 through standpipe 9 to the fluid bed 6 and gases from which the solid particles have been separated are directed from the upper portion of separator 8 through line 10 and the pressure control valve 11, preferably to heat recovery equipment of any suitable form, not illustrated.

A relatively dense stream or column of solid particles is directed from a suitable point within the fluid bed 6 of the regenerator downwardly through standpipe 12 and through the adjustable orifice or flow control valve 13 adjacent the lower end of standpipe 12 into transfer line 14, wherein the stream of hot regenerated solid particles meets and commingles with the incoming stream of fluid reactants supplied through line 15 and valve 16. A suitable differential pressure is maintained across the orifice or valve 13 to prevent the upward passage of fluid reactants from line 15 through standpipe 12 and the gas-lift action of the fluid reactants effects transportation of the solid particles from column 12 through line 14 into the lower portion of reactor 3. In case the reactants are supplied to line 14 in liquid state, they will be substantially vaporized by contact therewith with the hot regenerated solid particles supplied from the regenerator through column 12 and the resulting mixture of essentialy vaporous reactants and suspended solid particles is directed upwardly through the substantially conical lower head of the reactor and substantially uniformly distributed over the horizontal cross-section of its cylindrical portion in passing through a suitable perforate plate or distributing grid 17 provided, in the case illustrated, at substantially the junction of the cylindrical shell with the cone bottom of the reactor.

In the specific operation here illustrated, the bed 5 of subdivided solid particles within reactor 3 is also maintained in a fluid-like condition by the passage of fluid reactants and fluid conversion products upwardly through the bed at a velocity which partially counteracts the force of gravity on the solid particles and brings about their hindered settling. Also, in the case illustrated, a light phase region of materially reduced solid particle concentration is maintained in the upper portion of the reactor above the upper extremity 18 of the fluid bed. The mixture of fluid conversion products and suspended solid particles is directed from the light phase in the reactor to suitable solid particle separating equipment, such as the centrifugal or cyclone separator indicated at 19, wherein at least a substantial portion of the entrained solid particles are separated from the outgoing stream of fluid conversion products. The separated solid particles are returned from the lower portion of separator 19 through standpipe 20 to the fluid bed 5. Fluid conversion products are directed from the upper portion of the separator through line 21 and pressure control valve 22, preferably to further separating, fractionating and collecting equipment of any suitable conventional form, not illustrated.

A relatively dense stream or column of solid particles is directed from any suitable point in the bed 5 of the reactor beneath its upper extremity 18 downwardly through standpipe 23 and the adjustable orifice or flow control valve 24 disposed adjacent the lower end of the standpipe into transfer line 25. In line 25, solid particles from standpipe 23 meet and commingle with a stream of oxidizing gas supplied to line 25 through line 26 and valve 27. A sufficient pressure drop is maintained across valve 24 to prevent the upward passage of oxidizing gas from line 26 through standpipe 23 and the gas-lift action of the oxidizing gas transports the solid particles from standpipe 23 through transfer line 25 into the lower portion of regenerator 4. The mixture of oxidizing gas employed for regeneration and the suspended solid particles passes upwardly through the conical lower head of the regenerator and is distributed substantially uniformly over the horizontal cross-section of the cylindrical portion of the regenerator by means of a suitable perforate plate or distributing grid 28 provided, in the case illustrated, at substantially the junction of the cylindrical shell with the cone bottom of the regenerator.

In passing upwardly through the fluid-like bed 6 in the regenerator, a portion of the free oxygen in the regenerating gas stream supplied through line 26 is consumed to bring about rapid oxidation or burning of combustibles from the bed and regenerate the solid particles. The heat thus generated is distributed substantially uniformly throughout the bed 6 by virtue of its turbulent fluid-like condition and the relatively high concentration of solid particles within the bed. When the quantity of combustibles accumulated by the solid particles in the reactor and supplied therewith to the regenerator is so high in relation to the average residence time for the solid particles in the regenerator that the rate at which they are burned to obtain the desired degree of regeneration would cause the development of an excessively high temperature in the fluid bed 6 of the regenerator and thus cause damage or permanent impairment to the catalyst or contact material, we contemplate preventing the development of an excessive temperature in the fluid-like bed in the regenerator by recirculating cooled regenerated catalyst therethrough. This is now a common expedient in operations of the fluid bed type and obviates the use of a heat exchange type regenerator containing a large and well distributed area of heat exchange surface in the form of closely spaced tubes or the like. This control of the average temperature in the fluid bed of the regenerator may be accomplished, for example, by withdrawing a stream of catalyst from the upper portion of the fluid bed and returning the same through a suitable side-arm cooler or heat exchanger to the lower portion of the regenerator for recirculation through the bed. To avoid unnecessary complexity this feature is not illustrated in the drawing, since it is not essential in all operations contemplated by the invention and is not a novel part of the invention per se.

To materially reduce or prevent the passage of reactants and light combustible conversion products, such as occluded hydrocarbon vapors or gases, to the regenerator in the stream of solid particles supplied thereto from the reactor, suitable stripping gas, such as steam, for example, is supplied to standpipe 23 on the upstream side of valve 24 through line 47 and valve 48. Similarly, suitable stripping gas, such as steam, for example, may be supplied through line 49 and valve 50 to standpipe 12 on the upstream side of valve 13 to substantially free the column of solid particles passing through the latter of occluded oxidizing gas and combustion gases and prevent their passage from the regenerator to the reactor. The stripping gas also serves to keep the columns of solid particles passing through standpipe 12 and 23 sufficiently aerated to prevent a degree of compaction which would hinder or stop the flow of solid particles in these standpipes.

A representative sample stream of the gas mixture existing in the light phase above the fluid bed in the regenerator is directed from the gas discharge line 10 through line 33, valve 34 and a suitable orifice 35 to the combustion chamber 36 of the oxygen analyzing instrument which also comprises a portion 37 in which the resistance offered by a platinum coil 38 or the like to the passage of an electric current therethrough is measured and translated into an impulse varying in magnitude with the resistance of element 38.

A constant relatively small amount of air or other oxidizing gas is supplied to the combustion chamber 36 through line 39, valve 40, and orifice 41 to insure that the gas mixture in the combustion zone contains sufficient free oxygen to support combustion therein of its combustible components. Thus, before the combustible content of the gas mixture in the light phase reaches a value at which the mixture would ignite and burn with a flame in the light phase, the presence of this smaller amount of combustibles is indicated by burning of the mixture in chamber 36 where the combustion reaction is catalyzed. The resulting increased temperature in chamber 36 increases the resistance in element 38 and causes the transmission of an impulse through member 37 to controller 42.

Controller 42 is of the air-operated type in the case illustrated and air admitted to it at constant pressure through line 43 and valve 44 increases the pressure in the air output line 46 from this instrument when the impulse from member 37 exceeds a predetermined value indicating that the oxygen and/or other diluent gas supplied to the regenerator should be increased.

The air output line 46 from controller 42 communicates, in the case illustrated, with the underside of a diaphragm which adjusts the opening through control valve 27, this valve being an indirect-acting diaphragm-type valve in this instance. Thus, as the combustible content of the gas mixture leaving a light phase approaches the danger point, the increased air pressure in line 46 increases the opening through valve 27 to admit more oxidizing gas through line 26 and transfer line 27 to the regenerator. Preferably, the size of valve 27 is so chosen that, when it is fully open, oxidizing gas is admitted to the regenerator and passed through the fluid bed 6 at a rate such that the desired maximum gas velocity through the fluid bed is not exceeded. We thus avoid an excessively low solid particle concentration in the fluid bed.

With the control arrangement above described, it may be necessary to further dilute the gas mixture in the light phase after valve 27 is fully opened, in order to prevent the occurrence of a flammable mixture in the light phase. To accomplish this and still maintain the desired conditions of fluidization within bed 6, a line 51 containing control valve 52 and communicating directly with the light phase in the upper portion of the regenerator is provided for the admission of additional air or other non-combustible diluent gas to the light phase without passage through the fluid bed. A branch air output line 46′ from controller 42 communicates with the underside of the diaphragm which controls the opening through valve 52, this valve also being an indirect-acting diaphragm-type valve in the case illustrated.

Control valves of the general type above mentioned, employing a diaphragm or piston actuated by pneumatic or hydraulic pressure are available for operation within various pressure ranges, and we contemplate using such a valve at 52 which starts to open at approximately the same pressure on the diaphragm as that at which valve 27 is fully opened. For example, assuming that the controller is set to operate at an air output pressure of 0 to 15 pounds gauge, valve 27 would be adjusted for a full opening with 7½ pounds air pressure on the diaphragm while valve 52 would be adjusted to start opening at 7½ pounds and would be fully opened with a pressure of 15 pounds on the diaphragm. Thus, valve 52 automatically starts operating to admit diluent gas directly to the light phase as the gas velocity through the fluid bed 6 reaches or approaches the desired maximum value.

Of course, any other specific form of analyzing instrument capable of indicating the presence of small amounts of combustibles in the sample stream withdrawn from the regenerator may be employed within the scope of the invention. Also, any other suitable form of control instrument may be substituted for the type indicated at 42 and, when desired, hydraulic or electrically operated valves of any suitable well-known form may be substituted for the diaphragm-type air-operated valves 27 and 52. It is, of course, also within the scope of the invention to withdraw the sample stream supplied to the analyzer directly from the light phase of the regenerator instead of from the gas discharge line 10 and, when required, suitable filters or the like may be provided for removing entrained solid particles from the sample gas stream before it is supplied to the analyzer.

The term "non-combustible gas" as used in this specification and the appended claims is intended to include oxygen and air as well as gases which do not support combustion, such as carbon dioxide and nitrogen for example. Of course the term applies to gas mixtures as well as substantially pure gases and is intended to generically designate any gaseous or vaporous material which is capable of diluting the normal gas mixture existing in the light phase of the regenerator sufficiently to render the resulting mixture non-flammable under the operating condition of temperature, pressure and solid particle concentration prevailing therein.

We claim as our invention:

1. In a process wherein a bed of subdivided solid material susceptible to damage at high temperature is contacted in a confined zone with oxidizing gas to burn combustibles from the bed and resulting gaseous products, including any incompletely oxidized combustibles and unconsumed free oxygen, are discharged from the bed and from said zone through a region within the latter containing solid particles and in which the solid particle concentration is insufficient to effect the rapid dispersion of heat developed therein, the method of preventing the development of a temperature within said region which would cause damage to the solid material which comprises removing from said region a sample stream of said gaseous products and subjecting the same to combustion outside said region, diluting the mixture existing in said region with a sufficient quantity of non-combustible gas to render it non-flammable therein, and controlling the extent of such dilution in response and in direct relation to the temperature rise resulting from the combustion of said sample stream.

2. A process such as defined in claim 1 wherein said oxidizing gas is supplied to the bed at a sufficiently high rate that its free oxygen content is only partially consumed in passing therethrough and said oxidizing gas serves as at least a substantial portion of the non-combustible diluent gas in said region.

3. A process such as defined in claim 1 wherein said oxidizing gas is supplied to the bed at a sufficiently high rate that its free oxygen content is only partially consumed in passing threthrough and said oxidizing gas serves as a portion of the non-combustible diluent gas in said region, another portion of the diluent gas being supplied directly to said region without being passed through the bed.

4. A process such as defined in claim 1 wherein the rate at which gases are passed through and in contact with the bed is regulated to keep the bed in a fluid-like condition of relatively high solid particle concentration, and wherein at least a portion of said non-combustible diluent gas is supplied directly to said region without being passed through the bed.

5. A process for the conversion of fluid reactants in contact with subdivided solid catalyst which accumulates deleterious combustible products of the reaction, said process comprising maintaining a mass of the solid particles in a confined reaction zone, therein contacting the fluid reactants and catalyst and conducting the conversion reaction, removing resulting fluid conversion products from said mass and from the reaction zone, supplying a stream of the solid particles from the mass thereof in the reaction zone to a separate confined regenerating zone, therein maintaining a bed of the solid particles and burning combustibles therefrom to regenerate the catalyst by supplying air to the bed, passing said air and resulting gaseous products of combustion upwardly through the bed at a velocity which keeps the latter in a fluid-like condition of relatively high solid particle concentration, maintaining a light phase region of materially reduced solid particle concentration above the bed in the regenerating zone, returning a stream of solid particles from said bed to the reaction zone without passing the stream through said light phase, discharging gaseous products of the regeneration from the bed and from the regeneration zone through said light phase, subjecting at least a portion of the gaseous products to combustion outside said light phase region, and supplying non-combustible diluent gas to said light phase in a quantity varied in direct relation to variations in the temperature of the last-mentioned combustion step, whereby to keep the combustible content of the gaseous products in the light phase at a sufficiently low value that the mixture existing in the light phase is non-flammable therein.

6. The process defined in claim 5 wherein said air is supplied to the bed at a sufficient rate that only a portion of its oxygen content is consumed in passing through the bed, whereby the carbon dioxide and any steam formed by burning within the bed, together with nitrogen and unused oxygen of the air dilute carbon monoxide and any other combustibles evolved from the bed to a degree which renders the mixture non-flammable in said light phase.

7. The process defined in claim 5 wherein said dilution is accomplished at least in part, by supplying said air to the bed at a sufficient rate that only a portion of its free oxygen content is consumed in passing through the bed, and wherein additional dilution, beyond that obtainable without exceeding the desired gas velocity in the bed, is obtained by supplying additional non-combustible gas directly into the light phase without passing it through the bed.

8. A process such as defined in claim 5 wherein said reaction comprises the catalytic cracking of a fluid hydrocarbon and said solid particles comprise cracking catalyst.

CLARENCE G. GERHOLD.
JOHN E. BURGESS.